United States Patent [19]

Bedard

[11] Patent Number: 4,484,190

[45] Date of Patent: Nov. 20, 1984

[54] SYSTEM FOR LOAD OUTPUT LEVEL CONTROL

[75] Inventor: James F. Bedard, Schenectady, N.Y.

[73] Assignee: General Electric Company, Schenectady, N.Y.

[21] Appl. No.: 267,327

[22] Filed: May 26, 1981

[51] Int. Cl.³ ........................ H04Q 9/00; H05B 37/02

[52] U.S. Cl. .............................. 340/825.57; 315/291; 340/825.06

[58] Field of Search ...................... 340/825.06, 825.04, 340/825.57, 825.53; 307/40, 157, 115; 315/291, 306, 312, 316, DIG. 4; 455/603

[56] References Cited

U.S. PATENT DOCUMENTS

| | | | |
|---|---|---|---|
| 4,262,213 | 4/1981 | Eichelberger et al. | 307/40 |
| 4,305,006 | 12/1981 | Walthall et al. | 307/115 |
| 4,317,071 | 2/1982 | Murad | 315/312 |
| 4,355,309 | 10/1982 | Hughey et al. | 340/825.53 |
| 4,358,715 | 11/1982 | Dinges | 315/316 |
| 4,358,716 | 11/1982 | Cordes et al. | 315/306 |
| 4,388,566 | 6/1983 | Bedard et al. | 315/291 |
| 4,388,567 | 6/1983 | Yamazaki | 340/825.04 |

*Primary Examiner*—Donald J. Yusko
*Attorney, Agent, or Firm*—Nathan D. Herkamp; Philip L. Schlamp; Fred Jacob

[57] ABSTRACT

A system for programmable controlling the output level of at least one load, utilizes an isolated receiver-controller located adjacent to the load and receiving control data from at least one transmitter, which may be at a location remote from the load location. The transmitted data includes an address portion, identifying that particular one of a plurality of loads having the corresponding local address, and a command data portion, establishing both the on/off condition and the output level of the addressed load. Local control may be temporarily substituted for remote control. The output level is controlled by programmably varying the magnitude of an impedance coupled to a pair of load input terminals.

56 Claims, 7 Drawing Figures

32"

SYSTEM FOR LOAD OUTPUT LEVEL CONTROL

BACKGROUND OF THE INVENTION

The present invention is concerned with load control apparatus and, more particularly, with a novel system for programmably controlling the output level of a load and particularly the light output of at least one lamp, from locations remote from, or local to, and also isolated from the controlled load.

Conservation of energy is particularly desirable in this day and age. The ability to control the output level of a load, particularly from a remote location, facilitates many economic advantages. Specifically, the ability to set, from a central facility, the output of a plurality of light sources, located at various locations in one or more buildings, is highly desirable. With the advent of variable-output gas-discharge lamps, such as mercury-vapor-discharge fluorescent lamps and associated ballast, it is highly desirable to provide a system for controlling, from a central location, or from the vicinity of the loads, the output of each individual one of a multiplicity of lamps.

BRIEF DESCRIPTION OF THE INVENTION

In accordance with the invention, a system for programmably controlling the output level of each individual one of a plurality of loads, either from a remote location or from the vicinity of any one of the loads, includes: a transmission medium; at least one transmitter for providing to the transmission medium control data signals addressed to a selected one, at any particular time, of the loads, to establish the output level thereof; and a plurality of receiver-controllers each having a unique address and associated with at least one of the loads to be controlled. Each receiver-controller responds only to receipt of a control data transmission having the unique receiver-controller local address code as an initial portion of the transmission; decoding of subsequent command data, for local storage, occurs only if the proper address data is received. The locally-stored command data is decoded to provide both information as to the "on-off" condition of the controlled load, and information controlling the selection of a particular one of a plurality of possible output levels at which the associated load is to be energized. Local control switches and local/remote command selection apparatus may be used to provide temporary local control of at least one selected load.

In one preferred embodiment, each load includes at least one dimmable lamp and associated ballast, wherein the lamp output is controlled by the magnitude of a variable impedance established between a pair of ballast input terminals. The receiver-controller includes circuitry for establishing the desired impedance level at the ballast input terminals, while isolating the potentially hazardous ballast voltages from the receiver-controller circuitry.

Accordingly, it is an object of the present invention to provide a novel system for isolated control of load output level.

It is another object of the present invention to provide a novel system for remotely and programmably controlling the light output level of at least one gas discharge lamp.

It is a further object of the present invention to provide a novel system for selectively controlling the output level of at least one load from either a remote location or a location in the vicinity of the controlled load.

These and other objects of the present invention will become apparent upon consideration of the following detailed description, when read in conjunction with the drawings.

DETAILED DESCRIPTION OF THE INVENTION

Figure 1:
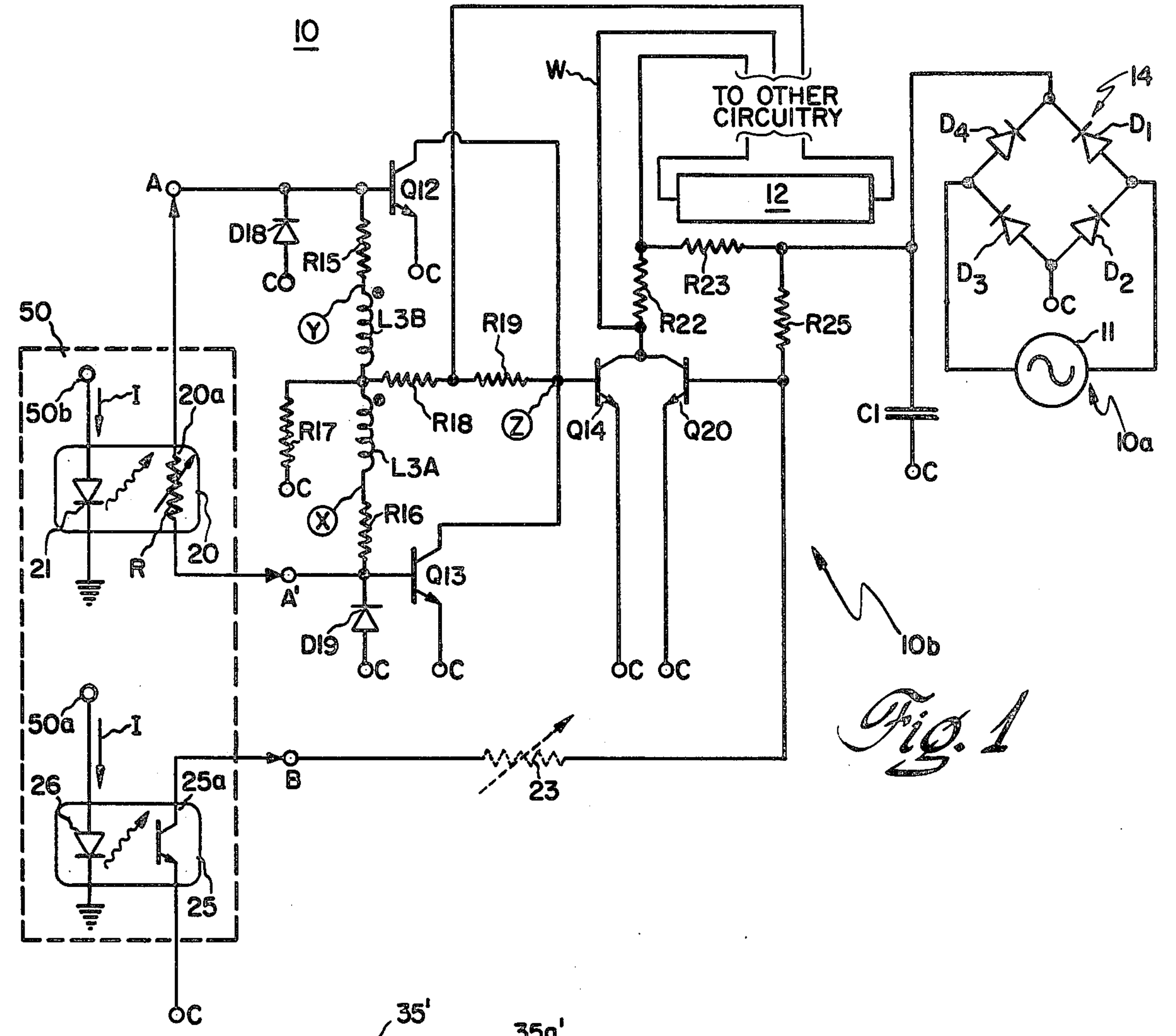
FIG. 1 is a schematic diagram of a portion of a ballast utilized for providing an adjustable light output level from a fluorescent lamp, and useful in understanding operation of the present invention.

Referring initially to FIG. 1, a ballast 10 is connected between an electrical energy source 11 and one or more gas discharge lamps, such as a fluorescent lamp 12. Ballast 10, of which only the power supply section 10*a* and control section 10*b* are shown, is configured to control the luminous output of fluorescent lamp 12 as a function of an externally-provided parameter, such as the magnitude of an impedance (electrical resistance) connected between control terminals A and A', and with the on-off function of the ballast-lamp combination being controlled by the impedance between an on-off terminal B and a ballast common line terminal C.

One method for providing a variable (dimmable) fluorescent lamp light level is described and claimed in co-pending application Ser. No. 177,835, now abandoned and one embodiment of an inverter-type ballast utilizing that method for fluorescent lamp light level control is described and claimed in co-pending application Ser. No. 177,942 issued Aug. 24, 1982 as U.S. Pat. No. 4,346,332, both of which applications were filed Aug. 14, 1980, are assigned to the assignee of the present invention and are incorporated herein by reference in their entirety. As described in the aforementioned patent applications, the AC energy source 11 is coupled to a bridge rectifier 14, comprised of diodes $D_1$–$D_4$, and a filter capacitor C1, which forms a power supply section 10*a* providing DC potential to the ballast, including a ballast di/dt control circuit section 10*b* and a ballast high-power inverter section (not shown) which is controlled by section 10*b* to provide relatively high-frequency energizing waveforms to fluorescent lamp 12. The level of light produced by fluorescent lamp 12 is a function of the frequency of the high-power inverter, which frequency is controlled by circuit section 10*b*. The control section 10*b* includes a di/dt sensor, or detector, consisting of transistors Q12 and Q13; resistors R15, R16, R17, R18, and R19; and dual transformer windings L3A and L3B. The di/dt-sensing control circuit has a threshold, or trip, point, which is the point at which the voltages at points X and Y drop to a low enough value to turn off both of transistors Q12 and Q13. Accordingly, the pair of transformer windings are wound upon a portion of the inverter transformer (not shown), such that if the voltage across transformer winding L3A is negative at the dotted end, a current will flow from point X, through resistor R16, and turn on transistor Q13, while the voltage across winding L3B is simultaneously negative at the dotted end, whereby transistor Q12 is turned off. Similarly, if the voltage across winding L3B is positive at the dotted end, a current will flow from point Y, through resistance R15, turning on transistor Q12, while the voltage across winding L3A is positive at the dotted end, applying a negative voltage to the base electrode of transistor Q13, which transistor is cutoff. As the windings L3A and L3B are of an equal number of turns, it will be appreciated that the voltages at points X and Y (obtained by coupling both windings to the same transformer core with substantially equal coupling coefficients) are substantially equal in magnitude but of opposite polarity, as indicated by the phasing dots. Thus, when the voltage at point X drops below a predetermined threshold value, transistor Q13, which was previously conducting, will turn off. At the same time, the voltage at point Y is equal in magnitude, but of opposite polarity, such that transistor Q12 is not conducting, whereby a node Z is at a voltage above common line C potential, since neither transistor Q12 nor transistor Q13 are conducting. As node Z is not at common line C potential, transistor Q14 is caused to conduct. This initiates a reversal of inverter load voltage, as described in more detail in the aforementioned patent applications. This load voltage reversal reverses the polarity of the voltages across windings L3A and L3B, whereby transistor Q12 is caused to conduct and turn off transistor Q14. The point X voltage changes until, at the preset threshold value, transistor Q12 turns off and again raises the voltage at node Z, again causing transistor Q14 to turn on to initiate reversal of the load voltage. The above-summarized action continues in cyclic fashion, with transistors Q12 and Q13 being alternately turned off when the absolute amplitude of the voltage at one of points X and Y reaches a preset threshold value. This preset threshold value is established by the turns ratio of windings L3A and L3B. Resistances R15, and R16, of substantially equal magnitude, are utilized to convert the voltages at points X and Y to currents for driving the base electrodes of respective transistors Q12 and Q13. The threshold value, at which the load voltage is switched (and which therefore establishes the light output of load 12) may be changed by the connection of a resistance between (a) each of the base electrodes of transistors Q12 and Q13, and (b) either common line C potential or the opposite transistor base electrode. Thus, connection of a resistance R between input terminals A and A' causes the instantaneous positive potential at one of points X or Y to be reduced, upon application of the associated winding voltage to the associated base electrode of respective transistors Q12 or Q13, via the voltage divider provided by resistances RR15 and R16 and the resistance between terminals A and A'. The voltage divider action is further enhanced by the connection of the opposite end of resistance R back to the instantaneous negative voltage at the remaining one of points Y or X, respectively. By means of this voltage divider action, the voltage, across that one of windings L3A and L3B associated with the transistor to be turned off, is applied to the base electrodes with decreasing magnitude for decreasing magnitudes of resistance R, whereby a particular polarity of voltage is applied to the load for increasingly shorter time intervals before load voltage switching occurs, thereby increasing the load driving frequency and reducing the light output from fluorescent light 12. If the resistance between terminals A and A' is substantially zero (a short-circuit) the voltages at the base electrode of both transistors Q12 and Q13 will be substantially zero, with respect to their emitter electrodes, since the voltages at points X and Y are always of substantially the same magnitude but of opposite polarity, and as resistances R15 and R16 are of substantially equal value. In this condition, transistors Q12 and Q13 are always cutoff and a maximum inverter frequency (minimum lamp output) condition occurs. Conversely, if the resistance between input terminals A and A' is of a relatively high value, the transistor base electrodes will then be essentially isolated from one another and the respective transistors Q12 and Q13 will be alternately turned on with relatively low absolute voltage magnitudes across the associated one of windings L3A and L3B; this corresponds to a relatively low frequency of inverter operation whereby fluorescent light load 12 operates at substantially constant maximum power and produces a substantially constant maximum light output, as further described and claimed in U.S. Pat. No. 4,060,752 (wherein the base electrodes of the control transistors are in no way coupled to each other), which patent is assigned to the assignee of the present invention and incorporated in its entirety by reference hereto.

In accordance with one aspect of the present invention, the load level-determining resistance between input terminals A and A' is provided by a photoresistance element 20, which may be a photocell and the like. A variable resistance 20*a* is thus provided which has a resistance magnitude established by the magnitude of light incident thereon. The incident light magnitude may be established by an associated photoemitter 21, such as a light emitting diode and the like, responsive to the magnitude of a current I flowing therethrough. Advantageously, element 20 is a photoconductor isolator, typically having a light-emitting diode 21 and CdS photoresistor 20*a*, such as may be provided by a Clairex CLM 6000 photoconductor isolator and the like.

As previously described, the inverter portion of the ballast switches the voltage across load 12 responsive to transistor Q14 entering the cutoff condition. By paralleling transistor Q14 with another transistor Q20, inverter switching (and therefore the existence of a periodic waveform necessary to cause load power consumption) may be defeated if parallel transistor Q20 remains in the saturated condition, preventing the voltage at line W (the common collector connection between transistors Q14 and Q20) from rising. Thus, if the magnitude of a resistance R25 is chosen such that transistor Q20 normally receives sufficient base electrode current to remain in the saturating condition, the load 12 is turned off. If input terminal B, connected to the base electrode of transistor Q20, is connected to system common line C, the base electrode current of transistor Q20 is shunted to common and transistor Q20 is cutoff, allowing the load to be turned on and the light output thereof to be controlled by the resistance of element 20*a* between input terminals A and A'. Conversely, if input terminal B is disconnected (allowed to float) from the ballast common terminal C, or if a resistance 23 of sufficiently large magnitude is connected between input terminal B and the base electrode of transistor Q20, the transistor Q20 receives enough base electrode drive current to reenter saturation and turn off load 12. Thus, in addition to the variable resistance provided between input terminals A and A' to establish the level of load light output, switching of input terminal B between a relatively low and a relatively high resistance condition, to ballast common terminal C, is required.

In accordance with another aspect of the invention, a photoisolator device 25 is provided having a light-responsive switching element 25*a*, such as a phototransistor and the like, connected between input terminal B and ballast common terminal C for providing a relatively low-resistance connection therebetween when element 25*a* receives a sufficiently large light input. Device 25 may be a photoisolator of the type having phototransistor 25*a* and, for example, a light-emitter diode 26 providing a light output responsive to the flow of a current I' therethrough, to control the collector-emitter circuit of phototransistor 25*a* between the high-resistance, or cutoff, condition (turning "on" fluorescent lamp 12 responsive to a lower-magnitude flow of current I') and a relatively low resistance condition (turning lamp 12 on responsive to a somewhat greater flow of current I').

Figure 2:
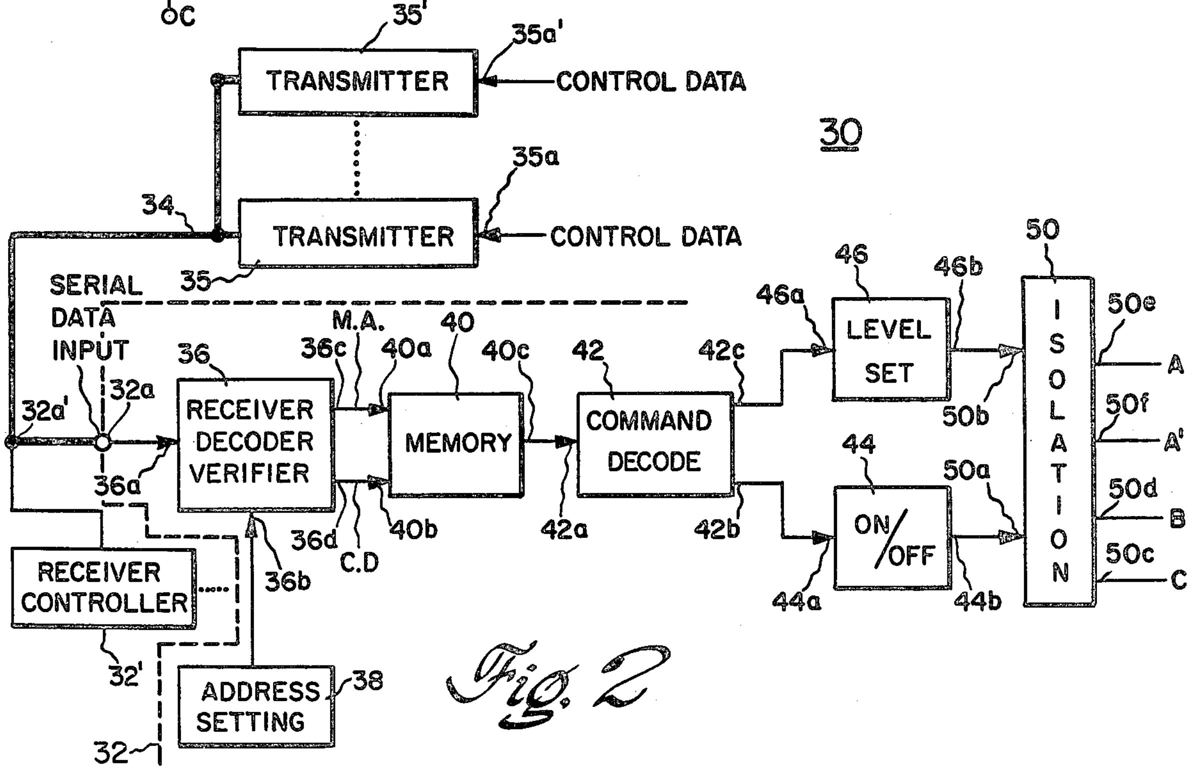
FIG. 2 is a block diagram of a control system for providing remotely-programmed impedances to the control inputs of the ballast of FIG. 1.

Referring now to FIG. 2, a system 30 is shown for providing the load-lamp-controlling resistances between level-controlling inputs A and A' and between "on/off" input terminal B and system common terminal C. System 30 includes: at least one receiver-controller means 32 (32', etc.) each located adjacent to at least one ballast 10; a systex transmission medium 34; and at least one control data transmitter means 35, (35', etc.), which may be remote from receiver-controller means 32 and which transmits load control data, provided at a control data input 35*a* (35*a*', etc.) thereof, via medium 34, to a serial data input 32*a* of the receiver-controller means. It should be understood that the control data from transmitter 35 may also be transmitted in a parallel data format, although serial data transmission is preferred as only a single active data path is required, rather than the plurality of active data paths required for parallel data transmission.

Receiver-controller means 32 includes a receiver-decoder-verifier 36 having a data input 36*a* receiving the serial data from receiver-controller input 32*a*. A second input 36*b* is connected to an address setting means 38 by which the address of a particular one of a plurality of remote receiver-control means 32 (each utilized to control one or more lamps 12) may be uniquely identified. Thus, a particular transmitter may be connected to media 34 terminated either by only a single receiver-controller means 32 (coupled to at least one ballast lamp combination) whereby address setting means 38 is not required, or by a plurality of receiver-controller means, whereby each means may require a separate address. One or more transmitters at various remote locations may be coupled, with their outputs in parallel to common medium 34, to at least one receiver-controller means 32 and its associated ballast-lamp combinations.

Where addressing of a selected one of a plurality of differently-addressed receiver-controller means is used, a first portion of the control data input to an active transmitter 35 will include a digital representation of the address of the receiver-controller means. Only if the correct address is received can a particularly addressed receiver-controller act upon subsequent command portions of the control data transmission. Thus, the initial digital address portion is received and decoded in means 36 and the received address data is compared to the local receiver-controller address set in means 38. Only if the received address data matches the local address set data from means 38 is the address verified by issuance of a memory-activate (MA) signal, provided at an output 36*c* of the receiver-decoder-verifier means 36. Further, only if the local address is verified, as matching the received address data, will the subsequent command data (CD) portion of a transmission be routed though means 36 to a second output 36*d* thereof, and coupled to a data input 40*b* of a memory means 40 for storage. Thus, upon receipt of a proper address, memory 40 is enabled by the appearance of the MA signal at a memory control input 40*a* thereof and the subsequently received data, provided at memory data input 40*b* is stored in the memory. Only the most current lighting control data need be stored and that stored data is continuously provided at a memory data output 40*c*, and coupled to the data input 42*a* of a command decoder means 42. Command decoder means 42 functions to separate the received serial CD transmission into an on/off-data portion, made available at command decoder means output 42*b*, and a level-setting data portion, made available at command decoder means output 42*c*. The on/off data at output 42*b* is coupled to the input 44*a* of an on/off control means 44, which decodes the on/off data and provides an on/off signal at its output 44*b*. Similarly, the decoded level set data is coupled from output 42*c* to the input 46*a* of a level setting means 46, which provides a resistance-level setting signal at its output 46*b*. On/off output 44*b* is connected to a first input 50*a* of isolation means 50, while resistance-level setting means output 46*b* is connected to a second input 50*b* of the isolation means. The state of the signal at first input 50*a* determines the resistance between a common output 50*c* and a first output 50*d*, respectively connected to ballast input terminals C and B for turning the ballast on and off. The level-setting signal presented at isolation input 50*b* is utilized to establish the resistance between a pair of isolation means outputs 50*e* and 50*f*, respectively connected to terminals A and A' of the ballast, for setting the lamp output level. Isolation means 50 may contain the photoresistive isolator 20, having its light emitting device 21 connected between input 50*b* and a receiver-controller means ground (not shown) and its photoconductive element 20*a* connected between outputs 50*e* and 50*f*, and may also contain photoisolator 25, having its light emitting device 26 connected between isolation means 50*a* and receiver-controller means ground, and its phototransistor 25*a* connected between isolation means output terminals 50*d* and 50*c*. Isolation may be provided by other means consistent with the need to float both the photoconductive element between ballast input terminals A and A' and the switching element connected between ballast input terminals B and C, due to the lack of connection of the ballast common C terminal to ground potential, to provide a degree of isolation consistent with personnel and equipment safety.

In one embodiment, transmitter 35 may be a type S2600 integrated circuit remote control encoder, available from American Microsystems, Inc., which encoder transmits the control data by pulse code modulation of a relatively high frequency (approximately 40 Khz.) squarewave, and the receiver-decoder-verifier means 36, memory means 40 and command decoder means 42 may be combined in a companion integrated circuit remote control decoder type S2601, also available from AMI. Utilizing the AMI integrated circuit set, the on/off function output is a binary signal, provided at output 42*b*, and the on/off control means 44 is an inverter having its output 46*b* connected through light-emitting diode 26 to operating potential. The inverter of means 44 is configured to provide light-emitting diode current sufficiently high to turn on ballast 10 in the "on"-commanded condition and to have a sufficiently low current level to cause the light-emitting diode output to turn off the associated phototransistor 25 and turn off ballast 10 in the "off" commanded condition. The type S2601 decoder has at least one pulse-width-modulated analog output 42*c*, whereby level setting means 46 is a known means for detecting one of a plurality of different analog levels, such as may be found in the type TL489 analog level detector integrated circuit available from Texas Instruments. Utilizing a TL489 analog level detector and five associated resistors for means 46, five different analog levels are detected to provide five different levels of current at output 46*b* to the light-emitting diode 21 connected to isolation means input 50*d*. Accordingly, the photoresistance provided between isolation means outputs 50*e* and 50*f* assumes one of five levels, whereby ballast 10 varies the light output of lamp load 12 to the commanded one of five different levels.

It should be understood that transmission media 34 may not only be a hard-wired media (such as a twisted pair, a coaxial cable and the like) but may be an optical fiber, a radio-frequency transmission link and similar media. Similarly, it should be understood that the control data may utilize binary or other digital coding and may include start bits, parity bits, stop bits and the like, in addition to address and command bits. It should also be understood that the controller output may be any controllable impedance acting upon the amplitude of the relatively high frequency waveform at the ballast input terminals A and A'; the use of a controllable resistance is, however, preferred at this time, due to both the ease of providing such a controllable resistance with relatively inexpensive components, and the desire to avoid determination of the need for compensation of reactive phase shift. A controlled impedance may also be provided by use of circuitry and methods as disclosed and claimed in co-pending application Ser. No. 242,780, abandoned; Ser. No. 242,782, now U.S. Pat. No. 4,345,200, issued Aug. 17, 1982; and Ser. No. 242,783, now U.S. Pat. No. 4,376,969, issued Mar. 15, 1983, all filed on Mar. 11, 1981, assigned to the assignee of the present invention and incorporated herein in their entireties by reference.

Figure 3A:
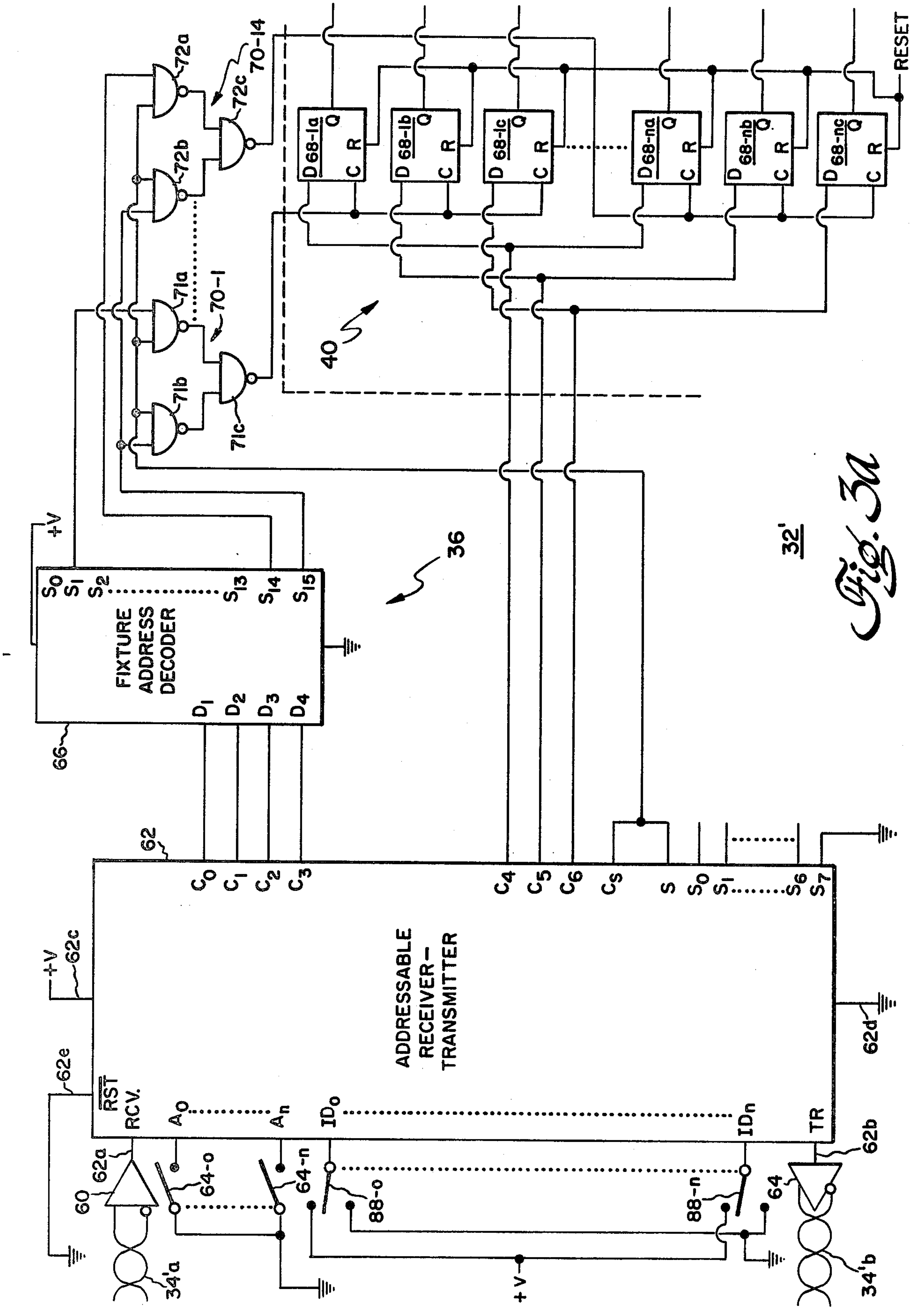
FIGS. 3*a* and 3*b* are coordinated portions of a schematic block diagram of one presently preferred receiver-controller portion of the system illustrated in FIG. 2.
Figure 3B:
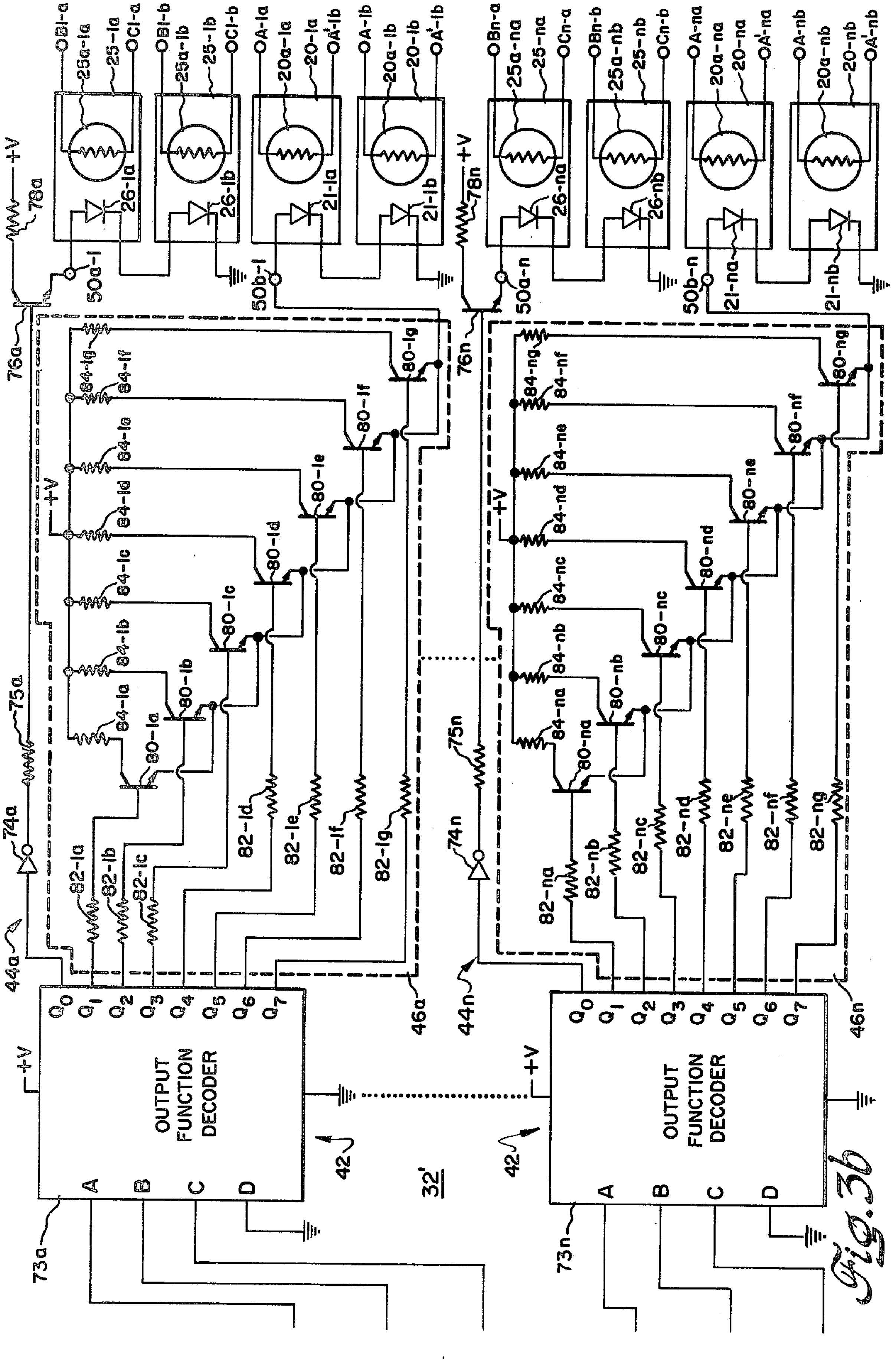

Referring now to FIGS. 2, 3*a* and 3*b*, another embodiment of a light level control system utilizes a receiver-controller section 32' receiving serial data over a twisted-pair transmission medium 34'*a*. The incoming data is buffered by a line receiver 60, such as is formed in a portion of a Motorola MC696 integrated circuit, and the buffered received data is applied to the received data (RCV) input 62*a* of an addressable receiver-transmitter means 62, which forms a portion of the receiver-decoder-verifying means 36. In the illustrated embodiment, addressable asynchronous receiver-transmitter 62 is illustratively a type MC 14469 integrated circuit, available from Motorola, which integrated circuit also has the capability of transmitting data from a transmit TR output 62*b*. Accordingly, a line transmitter 64 may be utilized either with a twisted pair medium 34'*b* separate from the incoming data medium 34'*a*, or with common media and known coupling-isolation techniques, to signal back to a central location for purposes hereinafter explained. Addressable receiver-transmitter means 62 receives operating potential, of magnitude +V, at input 62*c* with respect to ground potential at input 62*d*. A reset input 62*e* is connected to ground potential to allow continuous operation of the receiver.

Local address inputs $A_0$–$A_n$ are each connectable through an associated single-pole, single-throw switch means 64-0 through 64-*n*, to ground potential. A binary-coded local address is established by the closure position of each of switches 64-0 through 64-*n*, in predetermined manner. A first set of four latched output data lines (e.g. the four lines $C_0$–$C_3$) are connected to a like number of associated data inputs (e.g. the four inputs $D_1$–$D_4$) of a decoder means 66, which may be a Motorola MC14514 integrated circuit or the like. In the embodiment illustrated in FIGS. 3*a* and 3*b*, a single receiver-controller means 32' is utilized with up to 15 addressable ballast-lamp (or lighting fixture) load combinations. The fixture address decoder means 66 is utilized for decoding the address of a particular ballast-lamp (fixture) combination which will have the light level thereof adjusted to one of a predetermined number (e.g. eight) of levels in accordance with the various combinations of a number (e.g. three) of bits of binary data present at other addressable receiver-transmitter means data outputs (e.g. output $C_4$–$C_6$). A data strobe ($C_S$) output provides a pulse signal if acceptable data is latched and present at the receiver-transmitter data outputs (e.g. outputs $C_0$–$C_6$). Ballast-lamp address decoder means 66 has a plurality of individually and mutually-exclusively activated outputs $S_0$–$S_{15}$, equal in number to the number of combinations of the binary data bits present at inputs $D_1$–$D_4$. The receiver-control means 32' illustrated in FIG. 3*a* and 3*b* is also configured such that one of the 16 possible ballast-load addresses (specifically that address associated with output $S_{15}$) will simultaneously command all 15 ballast-lamp combinations to that lighting level established by the data at outputs $C_4$–$C_6$ at that time.

Thus, addressable receiver-transmitter means 62 and decoder means 66 form the receiver-decoder-verifier 36 and switches 64 form address setting means 38. Memory means 40 is provided by a bank of type-D flip-flop logic elements 68-1*a* through 68-*nc*. Thus, the number of addressable locations in a random-access memory means, with each addressble location here being a memory means flip-flop, is equal to the product of the number of lighting level bits (the 3 bits at outputs $C_4$–$C_6$, in the illustrated embodiment) times the number of individual ballast-load combinations addressable by the receiver-control section (the 14 combinations addressable by address decoder outputs $S_1$–$S_{14}$ in the illustrated embodiment as output $S_0$ is not used here); therefore, a total of $3 \times 14$, or 42, flip-flop stages are utilized in the illustrated configuration. The data D input of each of the 68-*pa* flip-flops, where p is an integer between 1 and some number n (here n=14) is wired in parallel to the first lighting level data bit $C_{d4}$ output The data inputs of the 68-*pb* flip-flops are wired in parallel to the second lighting level $C_5$ data output and the data D inputs of the 68-*pc* flip-flops are wired in parallel to the third lighting level data bit $C_6$ output. To properly store the three lighting level data bits, each of the three flip-flop elements associated with a particular ballast-load combination, such as flip-flops 68-1*a*, 68-1*b* and 68-1*c* associated with a first ballast-lamp, all have their clock C inputs wired in parallel to the output of 1 of n gating circuits 70. Each gating circuit, e.g., gating circuit 70-1 (associated with the flip-flops 68-1*a*, *b* and *c*), receives the output data strobe pulse from output $C_S$ and also receives a "store data" logic level from the output line of an associated address decoder output, e.g., first fixture address output $S_1$, and also from the "all address" output, e.g. $S_{15}$. A first two-input NAND gate 71*a* has a first ihput wired to the $C_S$ line and a second input wired to the associated address decoder output line, e.g. output $S_1$. A second two-input NAND gate 71*b* has a first input wired to the $C_S$ line and a second input wired to the "all-address" decoder output line, e.g. output $S_{15}$, utilized for enabling all ballast-lamp combinations. The outputs of both gates 71*a* and 71*b* are each coupled to a different input of a third two-input NAND gate 71*c*, having its output coupled to the clock C inputs of each of the three flip-flop elements associated with that ballast-lamp combination. Similarly, each additonal group of three flip-flops has its clock C input coupled to the output of that NAND gate, e.g. 72*c*, having its inputs coupled to the outputs of another pair of gates each having one input coupled to the $C_S$ line, and the remaining input coupled to either the "all" ballast-lamp combination line ($S_{15}$) or to the associated individual combination address decoder output, e.g., $S_{14}$.

The reset R inputs of all of the flip-flop elements utilized in memory means 40 are connected in parallel to a RESET line. The true Q outputs, of each group of three flip-flop elements associated with a particular ballast-lamp combination, are connected to three inputs A, B and C of a one-of-eight decoder 73, which may be a Motorola MC14028 integrated circuit, serving as command decoder 42. Each of decoder circuits 73*a*–73*n* illustratively has eight independently and mutually-exclusively activated outputs $Q_0$–$Q_7$; a first output $Q_0$ is connected to the input of an associated one of a like number of on/off means 44*a*–44*n*. The remaining outputs, e.g., outputs $Q_1$–$Q_7$, are connected to the inputs of an associated level setting means 46*a*–46*n*.

Each of on/off means 44*a*–44*n* includes an inverter 74*a*–74*n* having its output connected though an associated base-drive resistance 75*a*–75*n* to the base electrode of an on-off switching transistor 76*a*–76*n*. The collector of each of switching transistors 76*a*–76*n* is connected to operating potential (+V) through an associated current limiting resistance 78*a*–78*n*. The emitter electrode of each of switching transistors 76*a*–76*n* is connected to a pair of series-connected light emitting diodes (e.g. diodes 26-1*a* and 26-1*b* connected to the emitter of transistor 76*a*). The LEDs form a portion of the associated isolation means 50. As illustrated, each addressable ballast-lamp combination is a lighting fixture having a pair of ballasts, each operating a pair of fluorescent lamps; the isolation means 50 for a first fixture includes, in part, isolators 25-1*a* and 25-1*b*, each having their associated light-emitter diodes 26-1*a* and 26-1*b* connected in series to control the resistance of the associated photoconductors 25*a*-1*a* and 25-1*b*, between the associated on-off terminals B1-*a* and B1-*b* of the ballast of the first fixture, with respect to the ballast common terminals C1-*a* and C1-*b*.

Each of level setting means 46*a*–46*n* includes an array of transistor devices 80 (such as the seven devices 80-1*a* through 80-1*g* of first level set means 46*a*, or devices 80-*na* through 80-*ng* of the n-th level set means 46*n*). The base electrode of each transistor is connected through an associated base drive resistance (e.g., resistors 82-1*a* through 82-1*g* in means 46*a*, or resistors 82-*na* through 82-*ng* in means 46*n*) to the associated one of the output function decoder means outputs, e.g., $Q_1$–$Q_7$. The collector electrode of each of transistors 80 is connected through an associated current-setting resistance, e.g., resistances 84-1*a* through 84-1*g* connected in series with the collector electrodes of transistors 80-1*a* through 80-1*g*, to operating potential +V to establish the current flowing from the paralleled emitters of the transistors when the respective transistors are driven to saturation by the appearance of a high logic level signal at the associated Q output of the associated output function decoder 73. The values of resistors 84 may be selected to provide increasing current into the series-connected-light-emitting diodes 21 of the level setting portion of the isolation network, in accordance with a preselected function, such as doubling the current flow therethrough as each successive transistor in the chain is saturated. Therefore, if all of decoder outputs $Q_1$–$Q_7$ are at low logic levels, all transistors 80 may be in the cutoff conditon and current flow through light-emitting diodes 21-1*a* and 21-1*b*, for example, may be substantially zero, whereby the associated lamps produce substantially full luminous output. The appearance of a high logic level at the $Q_1$ output of decoder 70*a* will saturate transistor 80-1*a* and cause a first increment of current to flow through the light emitting diodes, establishing a first ("dimmed") lighting level; the appearance of a high logic level $Q_2$ output saturates transistor 81-1*b*, whereby, if the associated resistance 81-1*b* is chosen to be one-half the resistance of resistor 84-1*a*, twice the current flows through LEDs 21-1*a* and 21-1*b* and causes the lamp light output to be further reduced. Similarly, resistance 84-1*c* would have half the resistance of resistor 84-1*b*, whereby the current flow is again doubled and a further decrease in light output is produced. Thus, it will be seen that by step-wise decreasing, by a factor of two, the resistance of the associated resistors 84, the light-emitting diode current is step-wise increased by factors of two, and step-wise decreasing amounts of light are produced from the lamps driven by the ballast controlled by photoisolators 20-1*a* and 20-1*b*.

In operation, the addressable-receiver-transmitter 62 recognizes 11-bit serial address or command words, configured to consist of a start bit, eight data bits, one even parity bit and a stop bit; the most significant data bit is used as a word identifier, e.g., a binary 1 indicating receipt of an address word and a binary zero indicating receipt of a command word. Seven local address pins $A_O$–$A_n$ (e.g. n=6) allow 128 different receiver-controller means to be addressed. Upon receipt of a start bit (sent by a transmitter, or by one of a plurality of paralleled-output transmitters) at the RCV input 62*a*, an oscillator internal to addressable-receiver-transmitter means 62 begins operation and acts to strobe each bit of received data at the center of a clock period. The eight data bits and even parity bit are received and the eighth data bit is checked to ascertain the presence of a binary one (the address indicator). The parity bit is then checked for even parity and, after the stop bit is received, the first seven data bits are checked against the address states set by switches 64-0 through 64-*n* for the particular receiver-controller means. If a valid address match occurs, the addressable receiver-transmitter means await receipt of a command word. Upon receiving the command word, parity is checked for that word and then the eighth data bit is checked to ascertain that a binary zero (indicative of a command word) has been received. The first seven data bits are then internally latched and presented at latched data output lines $C_0$–$C_6$, simultaneously with a strobe pulse at the $C_S$ output.

Advantageously, addressable receiver-transmitter 62 may also, as hereinabove mentioned, transmit data. Thus, if the identifier inputs $ID_0$–$ID_N$ have the local address of the particular receiver-controller means set therein by means of switches 88-0 through 88-*n*, the data-present pulse at output $C_S$ may be connected to the Send S input and cause a data word to be transmitted back to the transmitter. The data word may include an initial portion having the identifier ID bits and also an eight-bit data word representing the data presented to a plurality (e.g. seven) of verifier inputs $S_0$–$S_6$ (and also including an eighth bit, which is set to a binary zero value by connecting input $S_7$ to ground potential). It should be understood that the seven bits of data presented to inputs $S_0$–$S_6$ may be the data available at the latched data outputs $C_0$–$C_6$, sent back for verification purposes to a central facility or to that one of a plurality of transmitters sending the initial data, that the data has been correctly received; the transmitted data may also be unrelated to the received data and may be provided by appropriate circuitry connected to inputs $S_o$–$S_6$.

Upon latching of the received data at outputs $C_0$–$C_6$ and the appearance of a data strobe pulse at output $C_S$, the address of the particular lighting fixture being commanded by the received pattern of data bits $C_0C_3$ is decoded in fixture address decoder means 66 and the associated gating means 70, whereby a gate pulse is provided to the clock C inputs to cause the associated flip-flop elements 68 of memory means 40 to store the three bits of function data present at data outputs $C_4$–$C_6$. This function data is held within the memory means until updated, whereby the data stored in that portion of memory means 40 assigned to other ballast-lamp fixtures may be addressed and modified, while the data for a non-presently-addressed lighting fixture remains available to its associated function decoder means 73. Function decoder means 73 decodes the particular on-off and level-setting functions encoded in the digital data stored in memory for the particular fixture associated therewith, and sets the current through the associated light-emitting diodes of the photoisolator means to establish both the presence or absence of a substantial short-circuit between the on-off input B and the ballast common C of a particular ballast, and also the magnitude of resistance between light-level inputs A and A' thereof. Thus, it will be seen that a digital data transmission is utilized to establish the light output of each one, or all, of a multiplicity of fluorescent lamps or lighting fixtures, with the actual data command for establishing the present light output of any one lamp or fixture being transmittable from a location other than the location at which the dimmable fluorescent lamp is located.

Figure 4A:
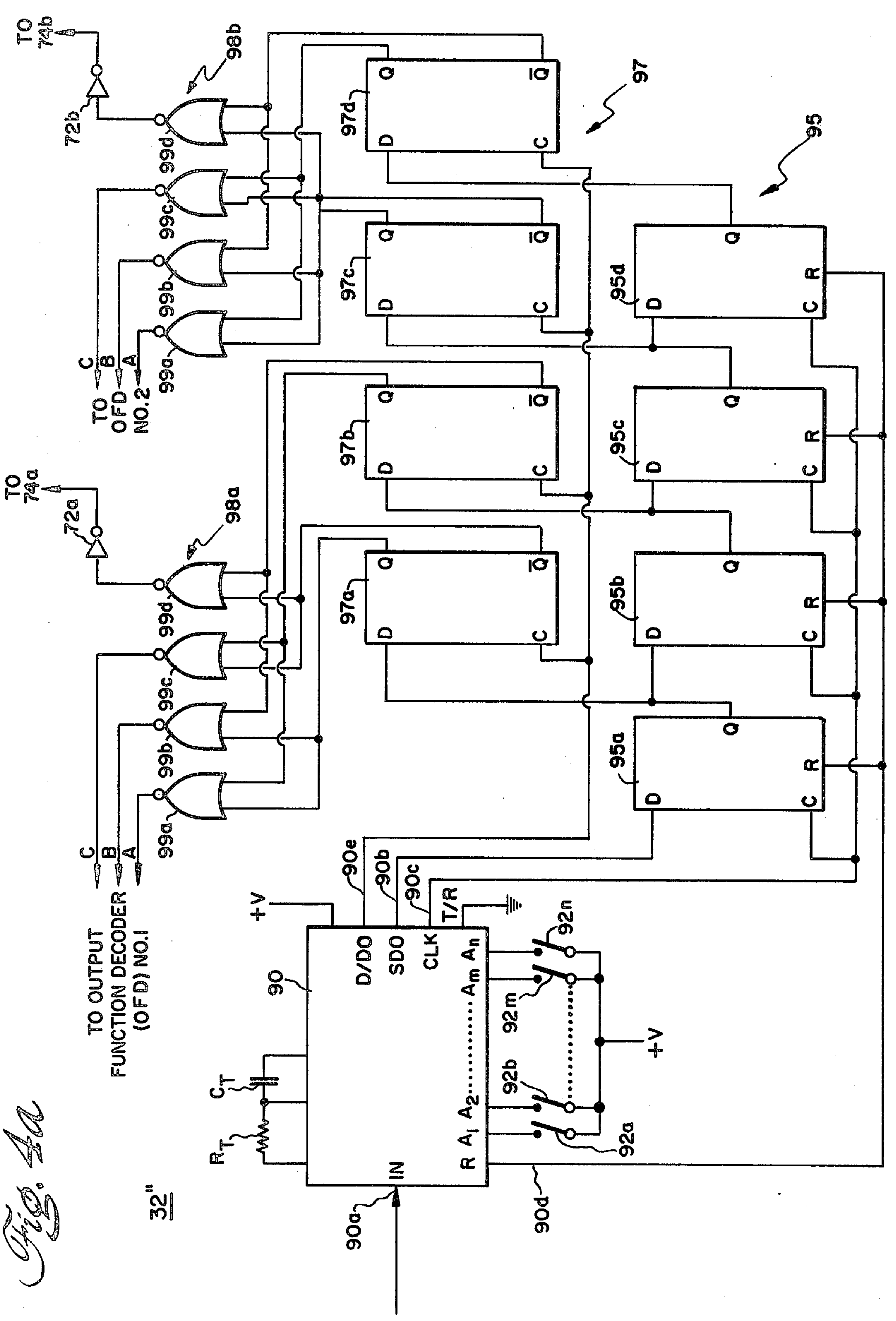
FIG. 4*a* is a schematic block diagram of another presently preferred embodiment of a receiver-decoder-memory section of a receiver-controller portion for the system of the present invention.

Referring now to FIG. 4*a*, another embodiment of a receiver-decoder-verifier, memory and command decoder portion 32 of the receiver-controller means is illustrated.

A data receiver 90 (such as a type ED-11 encoder-decoder integrated circuit, available from Supertex, Inc., or the like) has a data input 90*a* receiving a single digital word containing an initial address bit portion and a subsequent control data bit portion. Receiver 90 includes an internal oscillator having its frequency set by the appropriate choice of an external resistor $R_t$ and an external capacitance $C_t$. Receiver 90 is connected between operating potential (+V) and ground potential, and has a plurality of data input $A_1$–$A_n$, which in the illustrated ED-11 receiver integrated circuit, have a pull-down resistance to ground potential, whereby the desired local address data can be programmed by means of a bank of n switch means 92*a*–92*n*, selectively coupling positive operating potential +V to selected ones of the data input to encode the preassigned local address to a specific receiver. The data transmitted to receiver input 90*a* is, for the illustrated receiver means 90, formatted with a leader of a series of 12 logic-one start bits, used to synchronize the receiver clock oscillator to the incoming data clock rate. After transmission of the leader information, a 15 bit Manchester-coded data word is transmitted. Receiver 90 checks the first n received data bits ( where $n=11$ in the illustrated embodiment) against the n local address bits set by the switches 92. If all 11 bits (allowing a total of $2^{11}$, or 2048, different local addresses) are correct, a following sequence of command data bits (being four in number in the illustrated embodiment) are received, decoded internally in means 90, and serially provided at a serial data output (SDO) output 90*b*, simultaneously with four bits of a synchronized clock waveform at a clock (CLK) output 90*c*. Clock output 90*c* is connected in parallel to the clock C inputs of a plurality of type-D flip-flop elements, forming a serial shift register 95 of length equal to the number of control data bits to be received, e.g. four control data bits in the illustrated embodiment. Accordingly, the serial shift register 95 is comprised of four flip-flop logic elements 95*a*–95*d*, each of which may be provided by one-half of a type 4013 CMOS integrated circuit. The data D input of each flip-flop is connected to the true Q output of the previous flip-flop element, with the data D input of the first flip-flop element 95*a* being connccted to the SDO output 90*b* of the receiver. All of the reset R inputs of elements 95*a*–95*b* are connected in parallel to a reset R output 90*d* of the receiver. Thus, upon receipt of a valid 11 bit serial address, the next four bits, which are control data information, are made serially available at receiver output 90*b*, along with the associated clock at receiver output 90*c* to shift register 95. The serial control data bits are shifted through register 95 and, at the conclusion of reception of the input data word, the logic states of the true Q outputs of flip-flop elements 95*a*–95*d* contain the four controlled bits.

When the entire 15 bit data word has been received, a data/decoder output (D/DO) line 90*e* of the receiver is energized with a logic one level. A four-bit parallel-in/parallel-out data latch 97 is formed of four type-D flip-flop elements 97*a*–97*d*, each having a clock C input connected in parallel to the D/DO output 90*c* of the receiver and each havings its data input coupled to the true Q output of the associated stage of serial shift register 95. Thus, when D/DO line 90*e* is energized with a logic one level, the four control data bits, previously shifted into the four stages of shift register 95, are latched in latch means 97 and the digital data of the control bits is made available at the true Q and complement $\overline{Q}$ outputs of the latch flip-flop logic element stages 97*a*–97*d.*

In the illustrated embodiment, receiver-decoder-verifier, memory and command decoder portion 32″ is configured for independent control of each of two ballast-lamp combinations programmable to each of four levels ("off" and three discrete ighting levels between "dim" and "full output"). The ballast-light combinations may be individually or jointly isolated through isolation means 50, as shown in FIG. 2, with level setting means 46 (see FIG. 2) for each being provided by an output function decoder 73 and transistor-switch-/current-source circuit 46 (see FIG. 3*b*) connected to the isolation means. The three output function decoder inputs A, B and C, and the on/off transistor base electrode binary signal for each load combination, are provided by one of memory decoder circuits 98*a* and 98*b,* respectively. Each decoder 98 includes a plurality, e.g. four, of two-input NOR gates 99*a*–99*d,* such as are provided in a standard CMOS 14001 integrated circuit or the like. The inputs of gates 99*a* and 99*d* are connected to the true Q and complementary $\overline{Q}$ outputs of an associated pair of latch flip-flop elements 97*a*–97*d.* Thus, the gates of decoder 99*a* are connected to Q and $\overline{Q}$ outputs of first latch flip-flop elements 97*a* and 97*b,* while the inputs of decoder gate 98*b* are connected to the Q and $\overline{Q}$ outputs of the remaining pair of flip-flops logic elements 97*c* and 97*d.* The outputs of gates 99*a*–99*d* provide the decoded output function information, with the outputs of the first three gates 99*a*–99*c* respectively providing the A, B, and C output function information (to select the encoded 1 of 3 possible output states). The output of the fourth gate 99*d* is coupled to the associated on/off inverter 74 (e.g. gate output 99*d* of decoder 98*a* is connected to the input of the inverter 74*a*), to provide on/off control, if the $\overline{Q}$ outputs of the associated flip-flop logic elements of latch 97 are both in the high logic level condition.

It will be seen that, because the D/DO output 90*e* of the receiver is only activated when a complete address command data word is received and is deactiviated the remainder of the time (as when address-command data words are being sent to receivers having other local addresses), only the four control data bits for a proper local address are latched into latch means 97, and that data is continuously presented to the decoder gates for establishing the levels of current into the photoisolators of isolation means 50, thereby establishing and maintaining the control of light output from an associated ballast-lamp combination. Similarly, it will be seen that, as reset output 90*d* is enabled whenever a proper address, corresponding to the setting of local address means 92, is not received, the serial data shift register 95 is reset at all times when data is not being transmitted to the particular local receiver-controller means. It should be understood that a greater or lesser number of address and control data bits may be utilized to provide greater or lesser numbers of independently addressable receiver-controller means, and to provide greater or lesser number of discrete lighting levels obtainable with the dimmable fluorescent lamps utilizing the controlled circuitry of FIG. 1.

Figure 4B:
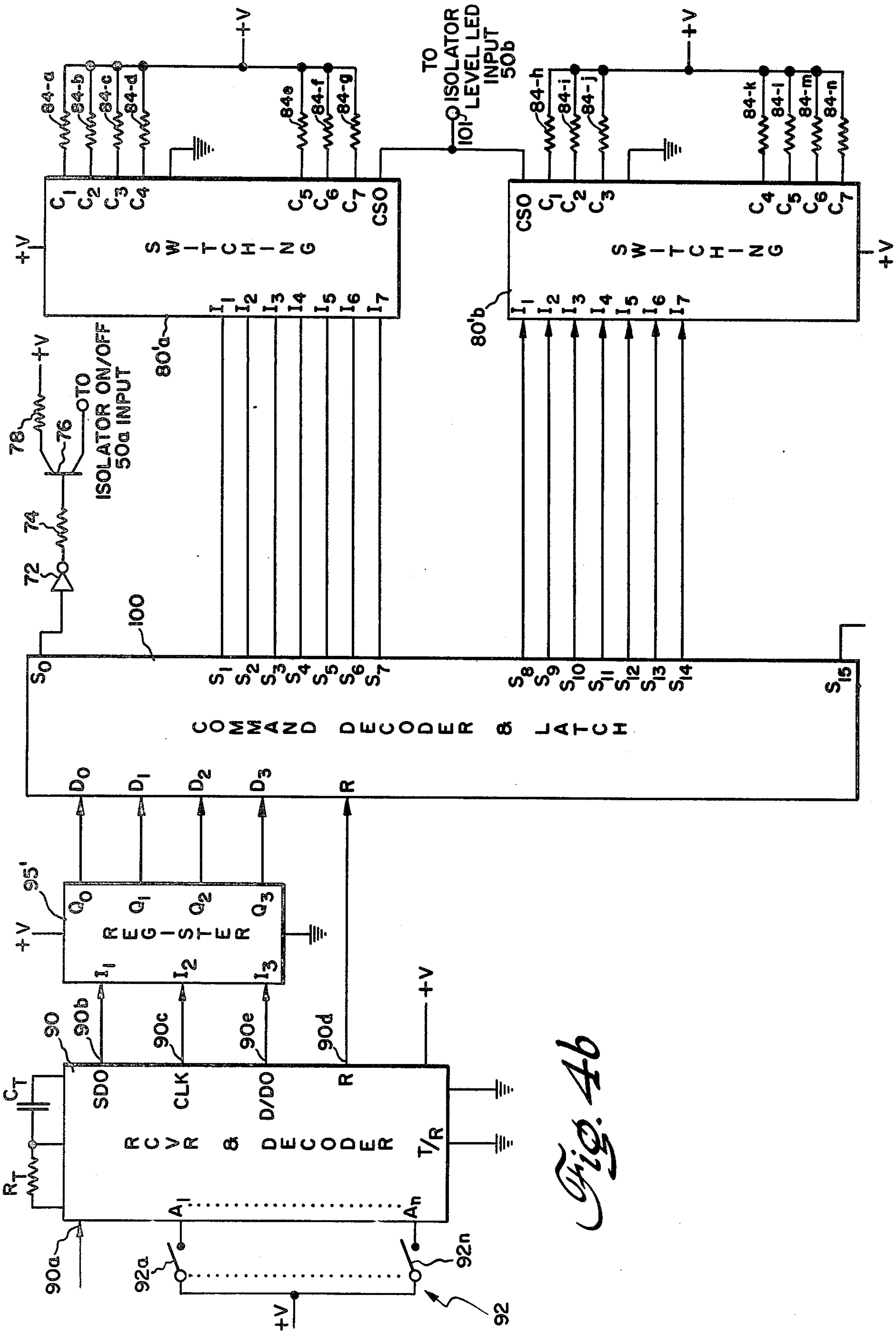
FIG. 4*b* is a schematic block diagram illustrating the use of the receiver embodiment of FIG. 4*a* in a receiver-controller portion of a system of the present invention.

In FIG. 4*b*, the receiver 90 and address setting means 92 are the same as in FIG. 4*a;* shift register 95 is replaced by a register 95′, having first, second and third inputs $I_1$, $I_2$ and $I_3$, respectively connected to outputs 90*b,* 90*c* and 90*d* of the receiver and decoder means 90. The four Q outputs of means 95 are represented by the four $Q_0$–$Q_3$ outputs of means 95′, which may be a Motorola MC14015 integrated circuit or the like. In FIG. 4*b,* latch 97 and the various decoder means 98 are combined in a single command decoder and latch means 100, as may be provided by a single Motorola type MC14514 integrated circuit or the like. As previously described hereinabove with respect to decoder 66 of FIG. 3*a,* receipt of four data bits at data inputs $D_0$–$D_3$ of command decoder and latch means 100 causes one of the $2^D$ (=16, for D=4) output lines $S_0$–$S_{15}$ to be enabled in mutually exclusive fashion. If on/off output line $S_0$ is enabled, an associated inverter 72 ceases to apply a drive current, through associated resistor 74, to the base electrode of switching transistor 76. The current flowing from operating potential +V, through a current-setting resistor 78, and from the emitter of transistor 76 to the isolator on/off input (LED 26 of FIG. 3*b*), is removed and the associated ballast-lamp combination is turned off. If any of the remaining outputs $S_1$–$S_{15}$ are enabled, the on/off output $S_0$ is disabled, whereby the output of the inverter 72 is a high logic level causing transistor 76 to saturate and provide a high "on" current level to the on/off isolator input. This turns the load (ballast and lamp) "on".

The individual output lines $S_1$–$S_{14}$, in this embodiment, are connected to the associated switching transistor array inputs $I_1$–$I_7$ of a pair of switching means 80′*a* and 80′*b*, respectively. These switching means replace the plurality of switching transistors 80 and associated base drive resistances 82, of FIG. 3*b*. Individual current-setting collector resistors 84-*a* through 84-*n* are connected between positive operating potential +V and associated switching means collector inputs $C_1$–$C_7$ of both switching means 80′*a* and 80′*b,* in manner similar to the connection of elements 84 of FIG. 3*b*. The current source output CS of each switching means integrated circuit (which may be a type CA3081 integrated circuit, available from RCA, or the like) are joined in parallel to the isolation means level LED input 50*b*. Thus, by suitable choice of different values for resistors 84-*a* through 84-*n,* the level of current at terminal 101 is established by that one of output $S_1$–$S_{14}$ of the command decoder and latch means then enabling switching of a particular one of resistor 84*a*–84*n* between operating potential +V and output 101. In the illustrated embodiment, any one of 14 preset lighting levels may be commanded; the "on" function automatically occurs if any one of the preset levels is commanded. The "off" function associated with command decoder and latch means output $S_0$ may alternatively be commanded.

Figure 4C:
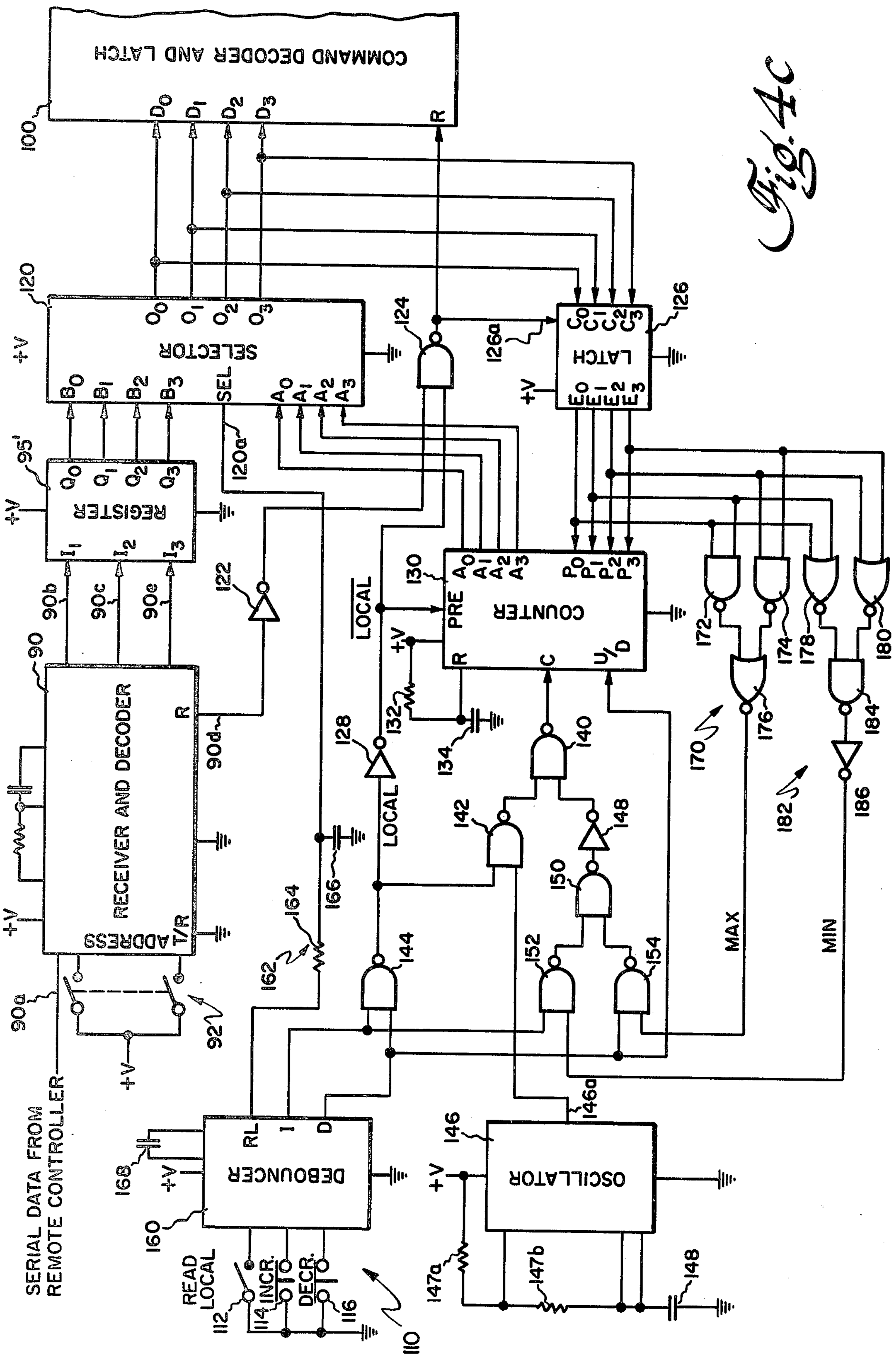
FIG. 4*c* is a schematic block diagram illustrating a portion of the receiver embodiment of FIG. 4*b*, with additional circuitry to facilitate either local or remote control of the load.

In FIG. 4*c,* the receiver and decoder means 90, address setting means 92, register 95′ and command decoder and latch means 100 are the same as in FIG. 4*b.* To provide for load control responsive either to the remote programming data serially received at input 90*a,* or responsive to a local control means 110 (including a READ LOCAL switch 112, an increase INCR load level switch 114 and a decrease DECR load level switch 116), a quad 1-of-2 selector means 120 is utilized between register means 95′ and command decoder and latch means 100. Selector 120 has a pair of four-bit-wide inputs, receiving local data bits $A_0$–$A_3$ or remote data bits $B_0$–$B_3$; the $B_0$–$B_3$ data bits are respectively supplied from the associated $Q_0$–$Q_3$ outputs of register 95′. The logic level at the selector control SEL input 120*a* determines whether the A data bits or the B data bits appear at the associated four outputs $O_0$–$O_3$ of selector means 120, for coupling to the associated four data inputs $D_0$–$D_3$ of command decoder and latch means 100. Selector means 120 may be comprised of a standard integrated circuit, such as the CD40257 CMOS quad 1-of-2 line data selector or the like.

Data must now be loaded into command decoder and latch 100 when either receiver and decoder means output **90*d* is at a high level, if remote programming of the load is to occur, or responsive to a closure of the READ LOCAL switch 112, if load control of the load is desired. Accordingly, receiver and decoder output 90*d* is connected to the input of a first inverter 122, having its output connected to one input of a two-input NAND gate 124, itself having its output connected to the R input of the command decoder and latch means 100. Thus, when receiver and decoder means output 90*d* is at a high logic level, the associated low logic level at the input of gate 124 provides a high logic level at the command and decoder latch means R input. The output of gate 124 is also connected to an enable input 126*a* of a four-bit latch means 126. The data inputs $C_0$–$C_3$ of latch means 126 are connected to the associated selector means 120 outputs $O_0$–$O_3$. Thus, when the output of gate 124 is at a logic high level, the data at selector 120 outputs $O_0$–$O_3$ is stored into latch means 126 and made available at the associated outputs $E_0$–$E_3$ thereof. The selector means output data can also be entered into command decoder and latch means 100 and latch means 126 responsive to a $\overline{\text{LOCAL}}$ signal provided at the output of a second inverter 128. The output of inverter 128 is also connected to the preset-enable PRE input of a presettable up/down counter means 130. In the illustrated embodiment, wherein four-bit-wide data words are utilized, a four-bit presettable up/down counter 130 may be provided with a Motorola MC14516 or the like integrated circuit and a four-bit latch 126 may be provided with a Motorola MC14042 or the like integrated circuit. The presetting inputs $P_0$–$P_3$ of counter means 130 are connected to the associated outputs $E_0$–$E_3$ of latch means 126. The counter outputs $A_0$–$A_3$ of counter means 130 are connected to the associated $A_0$–$A_3$ inputs of selector means 120. The reset R input of counter means 130 is connected to positive operating potential +V through a resistance 132, and to ground potential through a capacitance 134, whereby counter means 130 is assured of being reset at each new application of power to the circuit. The clock C input of counter means 130 is connected to the output of a two-input NAND gate 140, having a first input connected to the output of another two-input NAND gate 142. One of the inputs of gate 142 is connected, along with the input of inverter 128, to the output of another two-input NAND gate 144. The other input of gate 142 is connected to the output 146*a* of a low-frequency oscillator means 146, typically providing a square-wave output having a frequency of about 2.5 Hz. In the illustrative embodiment, oscillator means 146 is provided by a known astable multivibrator oscillator, using a standard 555 type or the like timer integrated circuit. Timing resistances 147*a* and 147*b* and a timing capacitance 148 are connected to oscillator 146** in known configuration.

The remaining input of gate 140 is connected to the output of an inverter 148, having its input connected to the output of a two-input NAND gate 150. Each input of gate 150 is itself connected to the output of one of a pair of two-input NAND gates 152 and 154. One input of gate 152 is connected in parallel to an input of gate 144 and to an increase I output of a switch debouncer means 160, such as may be provided by a Motorola MC14490 and the like type integrated circuit. One input of gate 154 is connected, along with the up/down U/D input of counter means 130 and the remaining input of gate 144, to a decrease D output of switch debouncer means 160. A third debouncer means RL (READ LOCAL) output is connected through a low pass filter 162, comprised of a series resistance 164 and a shunt filter capacitance 166, to the selector means SEL input **120*a*. The inputs of the debouncer means 160 associated with respective outputs RL, I and D are respectively connected to the READ LOCAL switch 112, the increase INCR push button 114 and the decrease DECR push button 116; all of these switch means have the remaining terminal thereof connected to ground potential. As required for the particular switch debouncer integrated circuit utilized, a timing capacitance 168** is connected thereto.

A maximum-count MAX detection circuit 170 utilizes a pair of two-NAND gates 172 and 174, each having the output thereof connected to one input of a two-input NOR gate 176. The output of gate 176 is connected to the remaining input of gate 154. The inputs of gates 172 and 174 are respectively connected to the associated one of the $E_0$–$E_3$ outputs of latch means 126 and the associated one of the $P_0$–$P_3$ inputs of counter means 130. These same inputs and outputs are also connected to an associated one of the four inputs provided by a pair of NOR gates 178 and 180 of a minimum-count MIN detection circuit 182. The output of gates 178 and 180 are each connected to an associated input of a two-input NAND gate 184, having its output connected through an inverter 186 to the remaining input of gate 152.

In operation, upon initial application of power to the circuitry of FIG. **4*c*, counter means 130 is reset. If READ LOCAL switch 112 is initially open, the debouncer means 160 RL output is at a logic high level, which level is applied to selector means SEL input 120*a* and configures selector means 120 to connect the $B_0$–$B_3$ inputs to the $O_0$–$O_3$ outputs, whereby load control is responsive to the serial data presented at receiver decoder means input 90*a* from a remote controller. Upon receipt of data with the proper address, this data is provided, as hereinabove explained, at the $Q_0$–$Q_3$ outputs of register 95′, is transmitted through selector means 120 and appears at the $D_0$–$D_3$ of inputs of command decoder and latch means 100. The receiver and decoder means output 90*d* provides a data-valid logic-one level, which provides a logic-one level at the R input of means 100, to allow entry of four bits of load control data therein, and control the at least one load attached thereto. When output 90*d* goes to a low logic level, when a non-valid transmission is, or has been, received, the previously valid data is latched in means 100 and 126**, assuring that non-valid data is not used.

The four bits of data at the $O_0$–$O_3$ outputs of selector means 120 also appear at the $C_0$–$C_3$ inputs of latch means 126, and are loaded therein for storage responsive to the logic one level provided to latch control input **126*a* by the output of gate 124, responsive to each logic one level at receiver and decoder means output 90*d*. Thereafter, the four bits of data are provided by the latch $E_0$–$E_3$ outputs to both the presetting inputs $P_0$–$P_3$ of counter means 130 and the four inputs of each of the MAX and MIN detector circuits 170 and 182. Each change of remotely programmed load level thus provides the several, e.g., four, bits of information not only to command decoder and latch means 100 but also to counter means 130 and detectors 170 and 182 via storage in latch means 126. Accordingly, the bits of data stored in latch means 126 always represent the last commanded output level of the loads connected to the particular command decoder and latch means 100**.

If the READ LOCAL switch 112 is now closed, the RL output of the debouncer means 160 goes to a logic low level. This logic low level appears at the selector means SEL input 120*a* and causes the counter means outputs $A_0$–$A_3$ to be connected to the outputs of selector means 130 thence to the associated D inputs of the command decoder and latch means 100 and the associated C inputs of latch means 126. However, as latch enable input 126*a* does not immediately receive an enabling logic-one level, the data stored in latch mean 126 is the last, remotely-commanded level data. With both increase and decrease switches 114 and 116 initially open-circuited, the corresponding I and D outputs of debouncer means 160 are initially both at logic high levels, whereby the output of inverter 128 is also at a logic high level. The presence of this logic high level, at the counter means PRE input, causes the counter to preload the digital information representative of the last commanded load output level, from the data previously stored in latch means 126. One of switch means 114 and 116 is now actuated, causing the associated one of the I and D outputs of debouncer means 160 to go to a low logic level. The output of gate 144 now provides a logic-zero LOCAL level to enable gate 142, and also provides, through inverter 128, a logic zero level at the PRE input of counter means 130, enabling counting to commence therein. Counter means 130 will change the digital count at the A outputs thereof from the digital count information provided at the preset P inputs thereof, responsive to a clock pulse at the clock pulse C input; the counting direction (up or down) is responsive to the logic level at the U/D input. Simultaneously, the low logic level at the output of inverter 128 is itself inverted in gate 124 and applied to the R input of command decoder and latch means 100, causing entry of new data (provided from counter means 130 through selector means 120) therein.

Assuming initially that the output of gate 148 is at a logic one level, counter means 130 receives a clock pulse, via enabled gate 142, responsive to the oscillator means output 146*a* being at a logic one level; as this occurs approximately 2.5 times each second, the count in counter means 130 is changed approximately every 400 milliseconds, as long as switch 112 and one of switch means 114 or 116 are closed. This particular time interval was selected to allow the person manually controlling the load output to recognize a level change and have sufficient time to react and stop further changes when the desired level is reached. It should be understood that other count changing time intervals may be equally as well selected to achieve desired load output performance. It will be seen that the U/D counting direction input is connected to the D output of the debouncer means 160, whereby closure of DECR switch means 116 provides a low logic level at the U/D input, causing the counter means to decrement the count at the A outputs, from the count data previously provided at the P inputs. Similarly, if the INCR switch means 114 is closed, the debouncer means D output remains at a high logic level, and counter means 130 is incremented for each clock pulse, increasing the count at the A outputs thereof over the previously-entered count formation from the P inputs.

The load output levels are predeterminately established such that a count of 0000 at the A outputs of counter means 130 represents a load OFF condition, with the load being turned ON but to the lowest one of 15 possible levels for a counter means A output of 0001, and with the load controlled through 15 discrete steps for a maximum output level with the counter means A outputs provide a binary 1111 pattern. The output inverter 148 is used as a clock inhibiting signal, to prevent the load from cycling to an off condition (a binary 0000 representation at the A outputs) immediately after a maximum load level (a binary 1111) has been commanded and the INCR switch 114 remains closed, or to prevent the load from being turned off (a 0000 binary code at A outputs) and then immediately being commanded to the maximum-on condition (a binary 1111 code at the A outputs) if the DECR switch means 116 remains closed immediately thereafter. Thus, MAX detector 170 provides a logic one output level from gate 176 only when the previously-commanded load output level has reached the maximum (15 level) count, as stored in latch means 126. Thereafter, gate 140 is enabled only if the decrement switch 116 is pressed, providing a logic zero level to gate 154. If the increment switch 114 is pressed, the D output of debouncer means 160 will be at a logic high level, forcing the output of gate 154 to a logic low level. This forces the output of inverter 148 to a logic low level, inhibiting additional oscillator pulses from appearing at the clock C input of the counter and preventing the counter from recycling back to a 0000 binary count. Similarly, when the last load output level previously commanded and stored in latch means 126 is the binary 0000 command, the MIN detector 182 provides a logic one level at the output inverter 186 thereof, to one input of gate 152. Thereafter, closure of increment switch 114 provides a logic low level to the remaining input of gate 152, enabling the output thereof. The output of inverter 148 will be at a logic one level, enabling transmission of oscillator pulses through gate 140 to increment the count in counter means 130. However, if DECR switch means 116 is closed, the I output of debouncer means 160 will be at a logic one level, forcing the output of gate 152 to a logic zero level. This forces the output of inverter 148 to the logic zero level, inhibiting the application of additional oscillator output pulses to the clock input of the counter means and preventing decrementing of the 0000 count therein.

Since the previous commanded level data, whether the circuit is receiving this data from the remote controller or from the local increment and decrement switches 114 and 116, is stored in latch means 126, the load output level remains constant when switch means 112 is closed, as previously explained, or opened to again place the apparatus in the remote control mode. Therefore, the remote controller serial data will be ignored when the READ LOCAL control switch means 112 is closed and the local control switch means 114 and 116 will be ignored when switch means 112 is open and programmable remote control of the loads is enabled; however, there will be no immediate change in load output level merely by changing from remote to local, or local to remote, control.

There has been described a system for remotely controlling the impedance levels between, and isolated from, input terminals of a load, such that programaable control of the degree of load energy utilization is achieved. Several presently preferred embodiments of a receiver-controller for use in my novel system have also been described herein. It should be understood that many variations and modifications of both the control system and the receiver-controller will now occur to those skilled in the art, including use of various circuits and methods described and claimed in U.S. Pat. No. 4,213,182 issued July 15, 1980; co-pending U.S. application Ser. No. 0,89,478 filed Oct. 30, 1979, and copending applications Ser. No. 267,274, Ser. No. 267,330 and Ser. No. 267,328 filed on even date herewith, all assigned to the assignee of the present invention and incorporated herein in their entireties by reference, and that I intend to be limited only to the scope of the appending claims and not by the specific details described herein.

What is claimed is:

1. Apparatus for providing a control signal with a variable characteristic to a pair of load input terminals of a load having an output level controlled by the magnitude of the control signal characteristic provided at said input terminals, comprising:

transmitter means at at least one first location for transmitting a data signal containing load output level data;

transmission medium means for conveying said data signal between said at least one first location and a second location;

receiving means at said second location for receiving said data signal; said receiving means comprising address setting means for setting a local address; and decoding means for decoding the address data portion of the received data signal to provide an enabling signal allowing said variable characteristic control signal providing means to operate only if the decoded address data corresponds exactly to the local address set for said second location in said address setting means; and variable characteristic control signal providing means coupled to said receiving means for providing in electrically isolated manner to said load input terminals a variable characteristic load output level control signal with a magnitude responsive to the load output level data presented at said receiving means.

2. The apparatus as set forth in claim 1, wherein said data signal commences with an address data portion an includes a load output level data portion subsequent to said address data portion; and said receiving means further includes memory means for storing the received load output level data only if said enabling signal is provided by said decoding means; said stored data being subsequently provided from said memory means to said variable characteristic control signal providing means.

3. The apparatus as set forth in claim 1, wherein said receiving means includes memory means for storing the received load output level data and for providing the stored data to said variable characteristic providing means after the transmission of said signal is completed.

4. The apparatus as set forth in claim 3, further comprising local control means at at least second location for locally establishing alternate load output level data; and means for selecting, for introduction to said variable characteristic control signal providing means, load output level data provided from said memory means of said receiving means or from said local control means.

5. The apparatus set forth in claim 4, wherein said local control means includes latch means for storing the last set of load output level data previously provided to said variable characteristic control signal providing means; means for varying in a selected one of increasing and decreasing manner, the value of output level data previously stored in said latch means; and means for providing the increased or decreased value of load output level data to said variable characteristic control signal providing means.

6. The apparatus as set forth in claim 5, wherein said value varying means comprises a presettable, up-down counter having counting outputs, presetting inputs receiving the previous load output level data from said latch means for initially establishing the count at said counting outputs, the count at said counting outputs being controlled responsive to a clock signal and in a counting direction responsive to respective first and second signals; the counter counting outputs being connected to said selecting means.

7. The apparatus set forth in claim 6, wherein said load control means further includes first and second means respectively connected to said counting means for respectively providing said first and second signals to respectively increase and decrease the count at said counting inputs.

8. The apparatus as set forth in claim 7, wherein said first and second means include first and second switches respectively selecting the associated one of said first and second signals, to set said counting direction; oscillator means for providing a periodic signal; and logic means receiving said periodic, first and second signals for providing said periodic signal as said clock signal only if one of said first and second signals is present.

9. The apparatus as set forth in claim 8, wherein the count at said counter counting outputs has a preselected range with a minimum count and a maximum count; and further including means for inhibiting said clock signal if one of said minimum and maximum counts respectively appear and additional actuation occurs of that one of said first and second switches setting said counting direction in a direction to further respectively decrease or increase said count.

10. The apparatus as set forth in claim 3, wherein a plurality of loads are associated with a single receiving means, and each of a like plurality of variable characteristic signal providing means are associated with one of said loads; said load output level data also containing data designating at least one of said plurality of loads to be controlled to an associated output level; said receiving means including means for decoding the data designating those of said loads to be controlled to said associated output level; said memory means comprising a like plurality of data latch means each for storing output level data for associated one of said plurality of loads; and gating means coupled to said decoding means for enabling only those of said data latch means associated with the designated loads to store the associated load output level data.

11. The apparatus as set forth in claim 1, wherein said variable signal characteristic is the electrical impedance provided between said load input terminals, and said variable characteristic control signal providing means is a variable impedance providing means.

12. The apparatus as set forth in claim 11, wherein said variable impedance providing means comprises:

means for decoding said load output level data into a digital command specifying one of a plurality of preselected output levels;

means for controlling the magnitude of an electrical analog signal responsive to the value of the digital command; and means for providing an electrical resistance between said load input terminals with a magnitude responsive to the analog signal magnitude.

13. The apparatus as set forth in claim 12, wherein said resistance providing means is adapted to provide electrical isolation between said load input terminals and at least said analog signal providing means.

14. The apparatus as set forth in claim 12, wherein said resistance providing means includes means for emitting an optical flux of magnitude responsive to the magnitude of said analog signal; and means receiving at least a portion of said flux for providing a photoresistance between said load input terminals.

15. The apparatus as set forth in claim 14, wherein said photoresistance means is a photocell and said emitting means is a light emitting diode.

16. The apparatus as set forth in claim 14, wherein said photoresistance means and said flux emitting means are electrically isolated from each other.

17. The apparatus as set forth in claim 12, wherein said analog signal controlling means includes an analog signal output terminal; an array of switching devices each having an input and an output circuit enabled by a first level of an associated bit of the digital command signal present at the input; and a plurality of means each for providing a current source coupled through the output circuit, when enabled, of an associated switching device to said output terminal.

18. The apparatus as set forth in claim 17, further including a source of potential, and wherein each of said current source providing means is a resistance coupled between said potential source and said associated switching device output circuit.

19. The apparatus as set forth in claim 18, wherein said resistances are scaled to provide increasing magnitude of current to said analog signal output terminal as the value of said digital command increases.

20. The apparatus as set forth in claim 1, wherein said load further includes additional input terminals for controlling an on/off function of said load; and said apparatus further includes first means coupled to said receiving means for providing a first magnitude of impedance between said additional input terminals only if the load output level data commands said load to be in an on condition and have a substantially non-zero output level; said first means providing a second magnitude of impedance between said additional input terminals if said load output level data commands said load to be in an off condition.

21. The apparatus as set forth in claim 20, wherein said first resistance magnitude is less than said second resistance magnitude.

22. The apparatus as set forth in claim 20, wherein said first means includes means for emitting an optical flux of a first magnitude if said on condition is commanded and of a second magnitude, different from said first magnitude, if said off condition is commanded; and means receiving at least a portion of the optical flux from said emitting means for providing a photoresistance between said additional input terminals, said photoresistance having respectively said first and second magnitudes responsive respectively to said first and second magnitudes of optical flux.

23. The apparatus as set forth in claim 22, wherein said photoresistance means is a photocell and said emitting means is a light emitting diode.

24. The apparatus as set forth in claim 22, wherein said photoresistance means is a phototransistor and said emitting means is a light emitting diode.

25. The apparatus as set forth in claim 22, wherein said photoresistance means and said flux emitting means are electrically isolated from each other.

26. The apparatus as set forth in claim 1, further including at least one additional load each at a location which may include said first and second locations, each additional load having a pair of load input terminals, the magnitude of an impedance provided between said input terminals of each said additional load controlling the output level of that particular load; at least one additional receiving means each associated with at least one of said additional loads; said medium means also conveying said signal to all of said at least one additional receiving means; and means coupled between each of said additional signal receiving means and the input terminals of each associated one of said additional loads for providing to said associated additional load input terminals a variable impedance of magnitude responsive to the load output level data presented at the associated signal receiving means.

27. The apparatus as set forth in claim 26, wherein said signal includes an address data initial portion and a command data subsequent portion; and each of said additional receiving means includes: means for setting a local address unique to that additional receiving means; and means for decoding the address data portion of said signal to enable the associated variable impedance providing means to receive only that command data following an address data portion having the specific local address set for that particular one of the additional receiving means.

28. The apparatus as set forth in claim 27, wherein each of said additional receiving means further includes memory means for storing the received command data portion only if the enabling signal is provided by the associated verifying means; said stored data being subsequently provided to said variable impedance providing means from said memory means.

29. The apparatus as set forth in claim 26, wherein each of said additional receiving means includes memory means for storing the received load output level data and for providing that data td the associated variable impedance providing means after the transmission of said signal is completed.

30. The apparatus as set forth in claim 26, wherein the variable impedance providing means associated with each additional load includes: means for decoding said load output level data into a digital command specifying one of a plurality of preselected output levels; means for controlling the magnitude of an electrical analog signal responsive to the value of the digital command; and means for providing an electrical resistance between the input terminals of the associated load, said impedance having a magnitude responsive to the analog signal magnitude.

31. The apparatus as set forth in claim 30 wherein each resistance providing means is adapted to provide electrical isolation between the input terminals of the associated one of said additional loads and the associated analog signal providing means.

32. The apparatus as set forth in claim 30, wherein said resistance providing means includes means for emitting an optical flux of magnitude responsive to the magnitude of said analog signal; and means receiving at least a portion of said flux for providing a photoresistance, between the input terminals of the associated one of said additional load, of magnitude responsive to the received flux magnitude.

33. The apparatus as set forth in claim 32, wherein said photoresistance means is a photocell and said emitting means is a light emitting diode.

34. The apparatus set forth in claim 32, wherein said photoresistance means and said flux emitting means are electrically isolated from one another.

35. The apparatus as set forth in claim 30, wherein each said analog signal controlling means includes an analog signal output terminal; an array of switching devices each having an input and an output circuit enabled by a first level of an associated bit of the digital command signal present at the input; and a plurality of means each for providing a current source coupled through the output circuit, when enabled, of an associated switching device to said output terminal.

36. The apparatus as set forth in claim 35, wherein each analog signal controlling means further includes a source of potential, and wherein each of said current source providing means is a resistance coupled between each said potential source and each said associated switching device output circuit.

37. The apparatus as set forth in claim 36, wherein said resistances are scaled to provide increasing magnitudes of current to said analog signal output terminal as the value of said digital command increases.

38. The apparatus as set forth in claim 26, wherein each of said additional loads further includes additional input terminals for controlling an on/off function of said additional load; and said apparatus further includes second means coupled to at least one of said additional receiving means for providing a first magnitude of impedance between said additional input terminals of each associated additional load only if the load output level data commands said additional load to be in an on condition and to have a substantially nonzero output level and for providing a second impedance magnitude between said additional input terminals if said load output level data commands the associated at least one additional load to be in an off condition.

39. The apparatus as set forth in claim 38, wherein said first impedance magnitude is less than said received impedance magnitude.

40. The apparatus as set forth in claim 38, wherein each of said second means includes: means for emitting an optical flux of a first magnitude if said on condition is commanded and of a second magnitude, different from said first magnitude, if said off condition is commanded; and means receiving at least a portion of the optical flux from said emitting means for providing between said additional input terminals, said photoresistance having respectively said first and second magnitudes responsive respectively to said first and second magnitudes of optical flux.

41. The apparatus as set forth in claim 40, wherein each of said photoresistance means is a photocell and each of said emitting means is a light emitting diode.

42. The apparatus as set forth in claim 40, wherein each photoresistance means and the associated flux emitting means are electrically isolated from one another.

43. The apparatus as set forth in claim 26, wherein each of said load and said at least one additional loads is, in combination, at least one gas discharge lamp and at least one ballast means for energizing, and for varying the amplitude of the light emitted from, said at least one lamp.

44. The apparatus as set forth in claim 1 or 26, wherein at least one of said receiving means includes means for transmitting data from that receiving means, via said transmission medium means, to said at least one first location.

45. Apparatus as set forth in claim 44, wherein said data transmitting means includes means for setting a local address unique to that receiving means, said transmitting means being adapted to transmit said local address to said at least one first location immediately prior to transmission of said data.

46. Apparatus as set forth in claim 1, wherein said load is, in combination, at least one gas discharge lamp and at least one ballast means for energizing said at least one lamp and for varying the amplitude of the light emitted from said at least one lamp.

47. A system for controlling the light energy output of at least one gaseous discharge tube, comprising:

- a plurality of receiver/decoders, each having a unique address assigned thereto, each receiver/decoder having an input adapted to receive digital data having an address portion and a desired light output level data portion; each receiver/decorder including means, responsive to receipt of a digital data address portion having the unique address assigned to that particular receiver/decoder, for decoding the level data portion of the digital data; and means responsive to the decoded level data for generating a variable characteristic signal;
- a central transmitter coupled to the input of each of the plurality of the receiver/decoders and adapted to provide to said receiver/decoders said digital data;
- ballast means, coupled to an associated receiver/dccoder to receive the variable characteristic signal, for energizing an associated at least one gaseous discharge tube to a light output level responsive to the level data contained in the digital data transmitted from the central transmitter; and
- a plurality of local control means, each coupled to an associated one of said plurality of receiver/decoders, for facilitating local modification of the light output of the at least one gaseous discharge tube controlled by said associated receiver/decoder.

48. The system of claim 47 wherein each said local control means includes means for selectively varying the level of light output at a preselected rate chosen to cause the light output to discernibly vary and to permit sufficient reaction time to allow cessation of local control action at a desired light output level.

49. The system of claim 48, wherein each receiver/decoder is adapted to provide a plurality of discrete light output levels; said level varying means being adapted to sequentially vary through consecutive ones of said discrete levels.

50. The system of claim 49, wherein said level varying means causes the light output of the associated at least one gaseous discharge tube to respectively increase and decrease, responsive to said level varying means being respectively in a first condition and a second condition.

51. The system of claim 47, wherein said transmitter means includes means providing a command data portion of said digital data for specifying selection of a single ballast means and at least one associated gaseous discharge tube coupled to an addressed one of said plurality of receiver/decoders; and each said receiver/decoder includes means for electrically controlling a selected ballast means and associated at least one gaseous discharge tube to that light output level commanded by the command data received from said transmitter means.

52. The system as set forth in claim 47, wherein said each receiver/decoder includes means for establishing a minimum light output level below which the associated at least one gaseous discharge tube can not be operated.

53. The system as set forth in claim 47, wherein each receiver/decoder includes means for establishing a maximum light output level above which the associated at least one gaseous discharge tube can not be operated.

54. The system as set forth in claim 47, wherein each receiver/decoder further comprises memory means for storing the light energy output data last previously received from either said transmitter or the associated local control means.

55. The system as set forth in claim 47, wherein each receiver/decoder includes means for controlling a plurality of ballast means and the associated at least one gaseous discharge tube coupled thereto.

56. The system as set forth in claim 55, wherein said transmitter means includes means providing a command data portion of said digital data for specifying selection of at least one ballast means and at least one associated gaseous discharge tube coupled to an addressed one of said plurality of receiver/decoders; and each receiver/decoder further comprises means, responsive to the command data, for electrically controlling the light energy output of the selected at least one of the plurality of ballast and associated at least one gaseous discharge tube coupled to the addressed receiver/decoder means.

* * * * *